United States Patent
Bell et al.

(10) Patent No.: US 11,051,236 B2
(45) Date of Patent: *Jun. 29, 2021

(54) APPARATUS, DEVICES AND METHODS FOR CONTENT DISTRIBUTION AND ACCESS VIA OBJECT-MOTION TRACKING USING A WIRELESS COMMUNICATIONS NETWORK

(71) Applicant: bluField, Inc., Nashville, TN (US)

(72) Inventors: Charleson Bell, Nashville, TN (US); Warren Sadler, Nashville, TN (US); John-Mark Eberhardt, Nashville, TN (US); Ronnie Braxton, Nashville, TN (US); Ja'rell Wilson, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,639

(22) Filed: Mar. 21, 2019

(65) Prior Publication Data

US 2020/0037232 A1 Jan. 30, 2020

Related U.S. Application Data

(63) Continuation of application No. 16/008,556, filed on Jun. 14, 2018, now abandoned, which is a continuation of application No. 14/727,012, filed on Jun. 1, 2015, now Pat. No. 10,021,626.

(60) Provisional application No. 62/006,232, filed on Jun. 1, 2014.

(51) Int. Cl.
*H04W 48/14* (2009.01)
*H04W 4/021* (2018.01)
*H04W 64/00* (2009.01)

(52) U.S. Cl.
CPC .......... *H04W 48/14* (2013.01); *H04W 4/022* (2013.01); *H04W 64/00* (2013.01)

(58) Field of Classification Search
CPC ..... H04W 48/14; H04W 64/00; H04W 4/022; G01S 5/14; G01S 5/00
See application file for complete search history.

(56) References Cited

U.S. PATENT DOCUMENTS

| | | | |
|---|---|---|---|
| 9,445,389 B1* | 9/2016 | Kullman | H04W 64/003 |
| 2005/0186965 A1* | 8/2005 | Pagonis | G01S 5/0072 |
| | | | 455/456.1 |
| 2012/0146850 A1* | 6/2012 | Liu | G01S 19/09 |
| | | | 342/357.42 |
| 2014/0045541 A1* | 2/2014 | Moshfeghi | H04W 24/02 |
| | | | 455/500 |
| 2014/0118113 A1* | 5/2014 | Kaushik | H04W 12/12 |
| | | | 340/8.1 |
| 2014/0274127 A1* | 9/2014 | Beidel | G01S 5/00 |
| | | | 455/456.1 |

(Continued)

*Primary Examiner* — Min Jung (57) ABSTRACT

The systems and methods disclosed herein provide for the development of a wireless communication network that monitors a physical environment. The network components include relay nodes, parent modules and end user devices distributed throughout the physical environment. Such components are programmed, controlled and monitored via cloud computing while the components are also accessed for use by end users via mobile platforms. The systems and methods disclosed herein provides for the distribution of hyperlinked-content to end user devices.

1 Claim, 5 Drawing Sheets

(56) References Cited

U.S. PATENT DOCUMENTS

2014/0335897 A1* 11/2014 Clem .................. G08G 1/0112
455/456.3

* cited by examiner

APPARATUS, DEVICES AND METHODS FOR CONTENT DISTRIBUTION AND ACCESS VIA OBJECT-MOTION TRACKING USING A WIRELESS COMMUNICATIONS NETWORK

CROSS REFERENCE TO RELATED APPLICATIONS

This application is a continuation application of U.S. application Ser. No. 16/008,556, filed Jun. 14, 2018, which is a continuation application of Ser. No. 14/727,012, filed Jun. 1, 2015, which claims the benefit of U.S. Application No. 62/006,232, filed Jun. 1, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Bluetooth®, as a wireless communication technology, is gaining popularity in consumer applications. Companies are beginning to promote Bluetooth® enabled devices for location sharing, social media applications, keyless access, wireless identification, media sharing and other consumer applications. There is an increased need to develop systems, methods and infrastructure for content distribution and access within Bluetooth® wireless enabled networks.

BRIEF DESCRIPTION OF THE DRAWINGS

So that the manner in which the present application can be better understood, certain illustrations and figures are appended hereto. It is to be noted, however, that the drawings illustrate only selected embodiments and elements of an apparatus, devices and methods for content distribution and access via object-motion tracking and are therefore not to be considered limiting in scope for the apparatus, devices and methods for content distribution and access via object-motion tracking as described herein may admit to other equally effective embodiments and applications.

DETAILED DESCRIPTION

Bluetooth® beacons normally manifest as small, stand-alone circuit boards which possess Bluetooth 4.0, Low-Energy (BLE) enabled chipsets. BLE is a redesigned version of Bluetooth® classic, which previously required pairing. BLE is now implemented on most new smartphones, tablets, PCs and wearable technologies. BLE chip sets, like Bluetooth® beacons, can run up to 2+ years with a single coin battery—this lifetime depending on the signal strength and how frequent the chip set/beacons broadcast information and their own specific identification (ID) to compatible devices within range.

Beacons can broadcast their presence to all compatible devices from a 5 cm to 70 meter radius. Beacon communication range, however, depends on the physical operating environment as Bluetooth® uses the same electromagnetic radiation as 2.4 GHz WiFi routers. This operating environment can change because the signal can be diffracted, interfered or absorbed by water (including the human body). Compatible devices in range can monitor the Bluetooth® radio signal (without previous pairing) and estimate their distance to the beacon by measuring received signal strength (RSSI; measurement of power present in a received signal). The signal strength of a beacon is stronger as proximity increases. The higher the frequency at which the connected devices probe, or sample the Bluetooth® signal, the more responsive the mobile application and consumer experience.

Mobile devices can monitor signals from more than one beacon at a time and can estimate their distance to each beacon thus estimating relative location. Once a device obtains an ID and RSSI from a particular beacon, the device's proximity to the beacon can be calculated, and the device's micro-location triangulated from multiple beacons can be calculated. Even without a triangulated micro-location, contextual content can be displayed on a user's mobile device using just the detected ID and distance. Beacons broadcast under an embodiment tiny amounts of information; therefore the mobile device must fetch relevant content from a local database or from the internet. Currently, these Bluetooth® signal grids can be used in "geofencing"—where when a mobile device enters into the range of an active beacon, the application on the mobile device is notified, even if the mobile device is locked or the mobile app is currently inactive. Additionally, the mobile device is continuously monitoring the RSSI of nearby beacons and depending on the distance from the beacons, the context will change. These Bluetooth® signal rids are beginning to gain wide implementation.

More specifically, Bluetooth® implementation is beginning to rise in the use of retail applications. A consumer strolling through a mall or other retail area with Bluetooth® activated on their mobile device could receive a multitude of messages displaying discounts, special offers, historical information and advertisements. "Bluecasting" is a term used to describe direct marketing using Bluetooth®-enabled beacons. Some retail spaces have seen an increase in footfall (visitor traffic) following the implementation of bluecasting technology. These high-tech retail spaces have simultaneously seen an increase in sales exceeding 18% in less than three months following the institution of bluecasting. This design allows the institution of point-of-sale (POS) opportunities, consumer loyalty programs for frequent visitors and access to infrastructure maps and directions.

Figure 1:
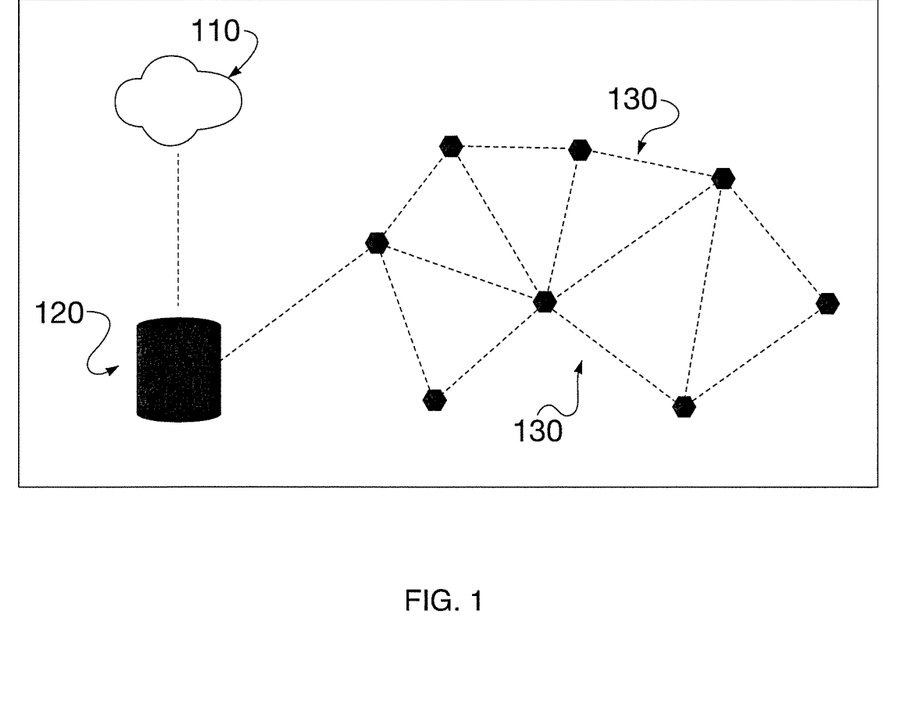
FIG. 1 is a schematic showing the composition of the Bluefield apparatus including relay nodes, parent module, and cloud master component, under an embodiment.

This disclosure provides apparatus, devices and methods for content distribution and access via object-motion and mobile device tracking using a Bluetooth®-enabled wireless communication network. FIG. 1 is a schematic showing the composition of the Bluefield apparatus including relay nodes 130, parent module 120, and cloud master component 110.

As shown in FIG. 1, the Bluetooth®-enabled wireless communication network apparatus (herein termed "Bluefield") may comprise devices which can be described as the cloud master 110 (or cloud master component), the parent module 120, individual relay nodes 130, and users/objects (not shown). It should be understood that the term apparatus may refer to an overall system of networked devices and corresponding systems and methods for providing Bluefield connectivity and functionality. The term apparatus may also refer to one or more such devices that underlie the Bluefield network and may also refer to the network connectivity itself. The context of the term's use governs its meaning.

Cloud Master

The cloud master is under one embodiment a programmable internet-based server system able to communicate with one or more parent modules (as described below) simultaneously via wireless communication protocols. The cloud master may be the hierarchical controller of the apparatus. Under an embodiment the cloud master controls the embedded code and thus the function of the parent modules. Under an embodiment, an administrator issues over the air wireless updates through the cloud master. Such updates to module firmware may increase detection capability of modules, i.e. increases capability to detect a wider array of beacon types as they are created by hardware companies. Such updates may also upgrade sensor systems, etc. The cloud master may also receive and monitor the transmissions received from the parent modules. The cloud master may collect all metadata transferred and communicated via the parent modules. Under one embodiment, the cloud master is equipped with analytical tools to characterize all collected data and commands into interpretable data. The cloud platform is the brain of the Bluefield and a Bluefield dashboard is under an embodiment provided to an administrator who may use such dashboard to monitor activities, e.g. foot traffic, and issue commands, e.g. push out embedded code to parent modules.

Parent Modules

The parent module, with unique ID, may be a wirelessly-enabled peripheral and portable device which may communicate with both the cloud master and one or more individual relay nodes (described below), simultaneously, via wireless communication protocols. The parent module may be deemed the mid-level manager of the apparatus. The parent module may control the embedded code and thus the function of the individual relay nodes within Bluetooth® range. Under an embodiment, an administrator issues over the air wireless updates to such embedded code through the cloud master. Such updates to node firmware may increase detection capability of nodes, i.e. increase capability to detect a wider array of beacon types as they are created by hardware companies. Such updates may also upgrade sensor systems, etc. Such updates may be issued to individual or all nodes. The parent module may receive and monitor the transmissions received from the individual relay nodes within Bluetooth® range. The parent module will transmit received information and metadata from individual relay nodes to the cloud master via wireless communication protocols. The parent module may store and collect information and metadata for triangulation with respect to other individual relay nodes/parent modules, and for later display, use or analysis. Such additional information may comprise proximity data, battery status, beacon sensor data, etc.

Relay Nodes

The individual relay nodes may comprise a wirelessly-enabled peripheral and portable device which may communicate with one or more other individual relay nodes within Bluetooth® range, a parent module within Bluetooth® range, and any one or more users utilizing Bluetooth®-enabled mobile devices and/or Bluetooth®-enabled mobile devices with embedded Bluefield code. The relay nodes communicate with all such components simultaneously, via Bluetooth® wireless communication protocols.

The individual relay nodes may be deemed the cog of the apparatus. Under an embodiment, the individual relay nodes are Bluetooth® beacons with specific ID and embedded code. The individual relay nodes may function similarly to the function of conventional Bluetooth® beacons. Under an embodiment, the individual relay nodes communicate and transmit data and instructions via signals tagged with their unique ID and their corresponding RSSI. The individual relay nodes may receive signals, instructions, data and determine RSSI from other individual relay nodes with unique ID, the parent modules and/or users utilizing compatible Bluetooth®-enabled mobile devices. The individual relay nodes communicate under an embodiment received data, measured RSSI values, and metadata to the parent module via Bluetooth®. The individual relay nodes may control the embedded code and thus the function of other individual relay nodes and/or other compatible Bluetooth®-enabled devices not yet associated with the Bluefield apparatus. Under an embodiment, an administrator issues over the air wireless updates to such relay nodes through the cloud master. Such updates to node firmware may increase detection capability of nodes, i.e. increase capability to detect a wider array of beacon types as they are created by hardware companies. Such updates may also upgrade sensor systems, etc. Such updates may be issued to individual or all nodes.

End Users/Objects

The end user may possess a Bluetooth®-compatible mobile device which contains Bluefield embedded code which, upon recognition by an individual relay node, begins to function as an individual relay node: except that instructions from individual relay nodes which are sent from the Bluefield are executed by the mobile device (i.e. content is displayed to the user utilizing the mobile device) and some additional information is stored and collected by the mobile device for triangulation with respect to other individual relay nodes, and for later display, use or analysis. Such additional information may comprise proximity data, battery status, beacon sensor data, etc. It should be noted that individual relay nodes (including Bluetooth®-compatible mobile devices functioning as a relay node) with internet capability may communicate collected and stored data to the cloud master for further use and storage.

For purpose of illustration, assume the deployment of relay nodes and a parent module in a physical environment. A user carrying a Bluetooth® enabled mobile device enters the same environment. Under one embodiment, the mobile device includes an application and corresponding API. Note that the application and API are referred to above as the embedded code under one embodiment. But it should also be understood that the embedded code may comprise different applications and enable different functionality. The mobile device, i.e. the application and API, interfaces with the Bluefield network apparatus as further described below.

Recall that relay nodes distributed in a physical environment periodically transmit their respective unique ID to advertise their presence. When the mobile device is in proximity to a relay node, the relay node transmissions send a notification to the application. The notification is effective even if the application is not currently running on the mobile device. When the mobile device receives the notification, the mobile device begins transmitting its own unique ID within the environment, i.e. within the network anodes. In other words, the mobile device functions just like a relay node. Accordingly, the mobile device not only transmits data using Bluetooth®, it also detects/receives data or instructions from relay nodes or modules via the same communication protocol. Note that under alternative embodiments, the mobile device may simply be Bluetooth® enabled without the embedded code described above. Under this alternative embodiment, proximity to a relay node or module may trigger the same effect as disclosed above, i.e. the mobile device begins to function as a node.

Continuing with the illustration, the mobile device enters the physical environment of the Bluefield network. The application and API running on the mobile device may be notified of the network's presence by one or more nearby relay nodes. The application/API may then periodically request location information from the Bluefield, i.e. from the cloud master which monitors information received by relay nodes and/or parent modules.

Under an embodiment, the cloud master knows the exact physical location of each relay node in the world. Further, as already described above, parent modules and relay nodes listen and detect signal transmission from other relay nodes and modules in their environment. Therefore, one or more nearby modules/nodes may detect/receive transmission signals from the mobile device. Such periodically transmitted signals comprise the device's unique id. These nodes/modules may also use signal strength of the transmissions to determine relative distance to the mobile device. The "listening" nodes may then transmit this information to the cloud master via the parent module while the "listening" parent modules transmit it's collected information to the cloud master, concordantly. Note that upstream transmissions from relay nodes and/or parent modules include corresponding unique identification numbers of the respective transmitting devices. When the cloud master receives this distance information from at least three relay nodes, the cloud master may then determine a physical location of the mobile device in the environment and in the world. In this manner the cloud master tracks the location of the mobile device moving throughout the physical environment.

The cloud master may use such information to identify and deliver contextualized location based data to the mobile device in real time. The cloud master may, under one embodiment, direct instructions to the mobile device through parent module and relay nodes. The instructions may comprise a URL for execution by a browser running on the mobile device directing the user to certain location contextualized content.

Under an embodiment, the mobile device may be a smartphone, tablet, computing-enabled wearable or other computing platform such as a laptop or hybrid platform.

Under an embodiment, the cloud mast nay operate as a web application or website stored, accessed and utilized via a server.

Figure 2A:
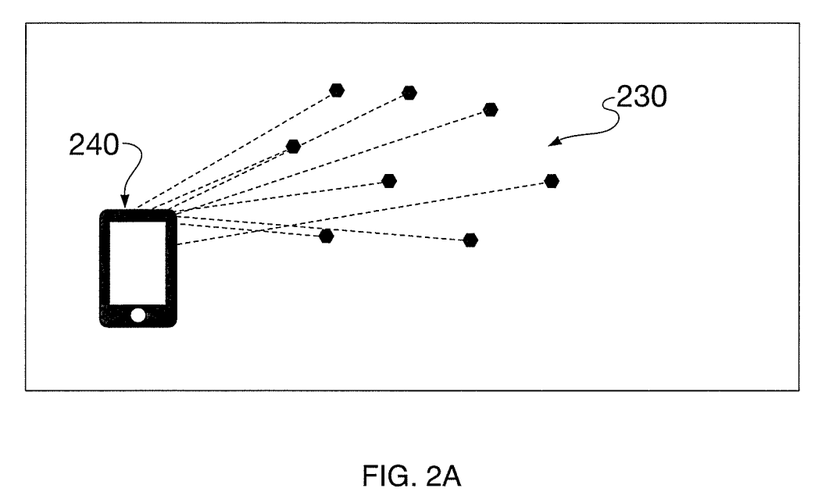
FIG. 2A is schematic showing a mobile-centric Bluetooth® based communication arrangement, under an embodiment.

FIG. 2A is schematic showing a mobile-centric Bluetooth® based communication arrangement, under an embodiment. FIG. 2A shows relay nodes 230 communicating with a central mobile device 240.

Figure 2B:
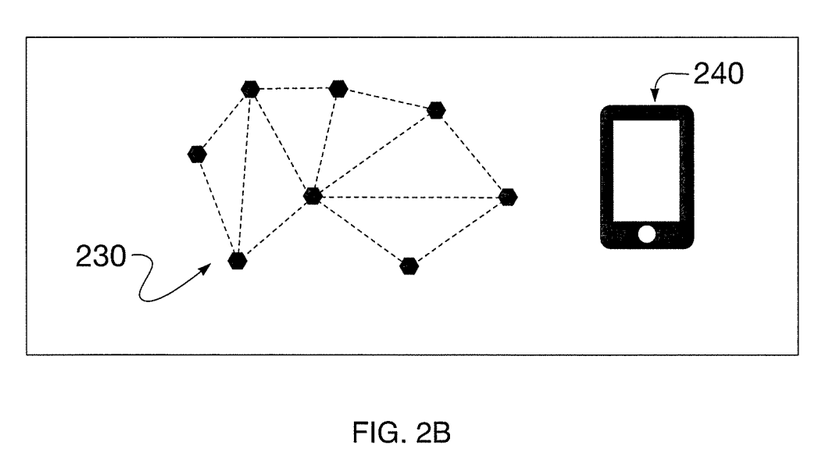
FIG. 2B is a schematic showing a node-centric Bluetooth® based communication arrangement, under an embodiment.

FIG. 2B is a schematic showing a node-centric Bluetooth® based communication arrangement. Under an embodiment, FIG. 2B shows a mobile device 240 functioning as one of the relay nodes 230.

FIGS. 2A and 2B clearly show differing network architectures. The devices comprising the apparatus disclosed herein communicate with one another under a (node-centric) architecture (FIG. 2B) as opposed to utilizing the mobile device as the central node of communication (mobile-centric) (FIG. 2A).

This disclosure teaches systems and methods for the physical initialization and setup of the apparatus. Said systems and methods include deliberate, infrastructure mapped deployment and auto-dispersive deployment. The apparatus may be deployed in a physical infrastructure according to a map of the infrastructure. The deployment may be carefully designed to take into account signal absorbing materials (i.e. walls, water, large objects), parent module and relay node signal radius (i.e. RSSI). The deployment may take into account the very purpose for the deployment of the Bluefield (i.e. design of the Bluefield to target or cover one area in an infrastructure more than another) in order to optimize the coverage of the Bluefield for a particular or specific application.

The deployment of the apparatus may be designed by superimposing potential locations of the parent modules and individual relay nodes on a map of the infrastructure. Following appropriate planning, the components of the apparatus may be placed according to the prescribed plan. Upon initialization of the components of the apparatus, the individual relay nodes and parent nodes may discover the existence of and distance between (via RSSI) nearby individual relay nodes, parent modules and users via Bluetooth®, Automatic discovery of nearby modules, nodes and devices acting as nodes is possible due the simple fact that all such components periodically transmit data using Bluetooth® communication protocols. Under one embodiment, nodes may be able to communicate between one another and transmit each other's RSSI back and forth for triangulation. Relay nodes transmit such information to parent modules. The parent module(s) may begin to communicate received information and metadata along with information received/collected directly by the parent module(s) to the cloud master. It should also be noted that parent modules may communicate with each other.

Using a programmable internet client, a user may then view a map of the infrastructure superimposed with the real-time location of the components of the Bluefield apparatus. Using a gaphical user interface provided by client application. The user may click on a particular component of the Bluefield apparatus, as depicted on the user interface, and re-program its function or check its status. An administrator may use the graphical user interface to point and click to control the Bluefield apparatus and its components. The administrator may also use the interface to monitor Bluefield components, e.g. beacon battery status, etc. The cloud master may communicate such instructions to and receive responses from the desired individual component of the apparatus via a parent module. Using the graphical user interface, an administrator may also select areas of the map and upload content to be delivered to specific individual relay nodes within the designated area. The graphical user interface shows a map under one embodiment. Superimposed on the map are squares or polygons. These polygons represent an adjustable area on the map. When an administrator clicks a polygon, a dialog box may open and prompt the upload of content (images, video, deals, offers, information). Once uploaded, users with a mobile device who enter that area covered by the polygon are transmitted that particular content under one embodiment. This also allows for specific targeting of users such as delivery at certain time of day to certain demographics or people.

Analogously, using an auto-dispersive deployment technique, the Bluefield apparatus may be deployed into an infrastructure or space without regard to the specific design of the infrastructure or space. Due to the fact that the components of the apparatus detect the presence and location of each other inherently, a Bluefield apparatus may be deployed and the relative locations of each component determined and mapped automatically; then superimposed in real-time on a schematic, map or image with the parent module(s) as a point of reference. This deployment may still be controlled, modified and monitored using a programmable internet client—much like the deliberate deployment method.

This disclosure provides systems and methods for the homeostasis and self-stabilization of the apparatus, said methods including self-monitoring, redundancy, and metastasis. The Bluefield apparatus may be implemented in order to monitor the location and status of each apparatus component with no need of external assistance (self-monitoring). The apparatus may be implemented in a manner of redundancy, where apparatus components duplicate the actions or critical functions of the apparatus to increase the reliability and robustness of the apparatus. En the event of the failure of an apparatus component, the apparatus may self-stabilize (operating to maintain homeostasis) by modifying the operation of other components in the apparatus to maintain the required functions of the apparatus. As one example of self-stabilizing is if a beacon goes down . . . and that particular beacon has a specific function . . . i.e. the welcome beacon . . . the apparatus may have the ability adjust the function of nearby beacons to complete the 'welcome task' until that beacon is replaced. Such event may simultaneously alert an administrator overseeing the operation of the apparatus. An individual overseeing the operation of the apparatus may be able to control and view the status and location of each Bluefield component. To achieve greater balance, coverage and reach, the apparatus may metastasize by expanding its coverage by detecting, connecting to and modifying the embedded code and function of compatible Bluetooth®-enabled chipsets which have the ability to be reprogrammed over-air and are within the Bluetooth® range of an apparatus component.

The disclosure provides systems and methods for the detection of a living object in the Bluefield. Living objects include human beings or other highly signal absorbing objects. Said systems and methods include the detection and analysis of measurable, transient changes and deflections in RSSI between individual relay nodes. Cloud master may perform such detection and analysis. Under an alternative embodiment, parent modules perform such detection and analysis. The Bluefield apparatus may be deployed by either deliberate or auto-dispersive methods. The apparatus may be empirically tested such that the transient effect on RSSI (between apparatus components) due to the absorptive nature of living objects, each of various size and densities, may be determined. Using these known empirical RSSI deflections, the apparatus may self-monitor the status of the apparatus components and notify an external user via cloud control if such transient deflections are detected.

The disclosure teaches systems and methods for the detection of users utilizing mobile devices in the Bluefield. Said systems and methods include the detection of Bluetooth-enabled mobile device transceivers by individual relay nudes and reassignment of the role of said transceiver to operate as an individual relay node of the apparatus. Individual relay nodes of the apparatus may detect the presence of a Bluetooth®-enabled mobile device and metastasize thus allowing for the tracking of the location of the mobile device through the Bluefield apparatus. Following colonization, the mobile device will function as an individual relay node of the apparatus. Under one embodiment, colonization only occurs if the target device runs a Bluefield application and corresponding API. Under an alternative embodiment, such embedded code is not required.

This disclosure describes systems and methods for the distribution of content to end users utilizing mobile devices in the Bluefield. Said systems and methods include a micro-location based cascading hyperlinked content interface and a superimposed, infrastructure map based gaphical user interface. Based on the location of the mobile device in the Bluefield apparatus, the apparatus may wirelessly deliver content to the mobile device. The content may arrive in the form of a hyperlinked image, moving image, or graphic, such that, upon a click, the user may be directed to content at a particular URL (uniform resource locator). The URL may: direct users to resources, media, and information; allow infrastructural access; direct users to point of sale applications; or display advertisements. This content may be displayed in a micro-location based cascading hyperlinked-content interface (MiLoCHI). The MiLoCHI may display hyperlinked-content in a stream or timeline (cascading) depending on the location of the user in the Bluefield apparatus (micro-location). As the user moves through the apparatus, new hyperlinked-content may be displayed on top of, or in front of, previous content which was delivered previously due to the prior micro-location of the user. The hyperlinked-content may also be displayed via a superimposed, infrastructure map based graphical user interface (SIIM-GUI). The SIIM-GUI may display hyperlinked-content superimposed on a real-time schematic of the locations of the apparatus components, also superimposed on a map of the infrastructure in which the apparatus has been deployed (if applicable). Such a map may comprise a downtown area of a city but embodiments are not so limited. As the user moves through the apparatus, the location of the user may be depicted in real-time on the interface. As the user approaches a specific contextual location, that specific displayed content grows under one embodiment to a larger size on the SIIM-GUI allowing the user to view and click if desired. The MiLoCHI or SIIM-GUI graphical user interface aesthetics, imagery and skin may change depending on the location of the device operating the MiLoCHI or SIIM-GUI within the Bluefield apparatus or within specific areas as determined by other wireless locationing modalities.

This disclosure describes systems and methods governing the communication and interface of third-party applications with the Bluefield apparatus. Access to the Bluefield apparatus and the data generated therefrom may be granted through, but are not limited to, the use of a software development kit (SDK) for development of third party applications, application program interface (API), a direct data draw or a combination thereof. Under an embodiment, third parties may want access to very particular data sets from Bluefield databases (maintained by cloud master) to analyze trends, etc. Such data may be transmitted through APIs or SDK application development.

This disclosure provides systems and methods for the detection of standard, unknown Bluetooth beacons. Parent modules may detect the UUID of an unknown Bluetooth® beacon. The apparatus may wirelessly transmit these unknown UUIDs to individual relay nodes, including but not limited to, Bluetooth®-enabled mobile devices comprising Bluefield embedded code. Individual relay nodes may detect the unknown, standard Bluetooth® beacon RSSI. At the highest (or a specifically set threshold) RSSI, when the individual relay node is in highest proximity to the unknown beacon, the individual relay node may communicate an estimate of the GPS/WiFi/Bluefield location to the parent module and/or cloud master. The cloud master may record each estimate and may generate an average thus pinpointing the location of that standard Bluetooth® beacon for triangulation with respect to other individual relay nodes, later display, use or analysis.

As one example of detecting an unknown Bluetooth® beacon, assume a Bluefield is set up in a city and a local company installs a new beacon. The problem arises when a nearby parent module detects this new beacon but only it's RSSI. Under this example, the parent module won't be able to precisely locate the beacon—it can only know how far the beacon is away. Otherwise, all the module knows is the UUID of the beacon.

Under an embodiment, the apparatus may transmit the unknown UUIDs to mobile devices which are functioning as individual relay nodes in a manner described above. In other words, the apparatus may transmit the unknown UUIDs to mobile devices running a Bluefield application with the Bluefield API. Users of such mobile devices may get 'danger close' to the unknown beacon as detected through Bluetooth communication. At this close proximity the Bluefield API transmits a WiFi location estimate (if on), a GPS location estimate f on) and a Bluefield location estimate (i.e. the mobile device will prompt the Bluefield for its location with respect to other known beacons and Bluefield will return a location as described above; the received location will be re-transmitted back as the Bluefield location estimate). These estimates will be transmitted to the cloud platform either through the parent modules or directly to the cloud platform. The cloud platform may under an embodiment obtain all location estimates from multiple users (mobile phones) and calculate a location average. That average may then be set as the location of that particular beacon.

Figure 3:
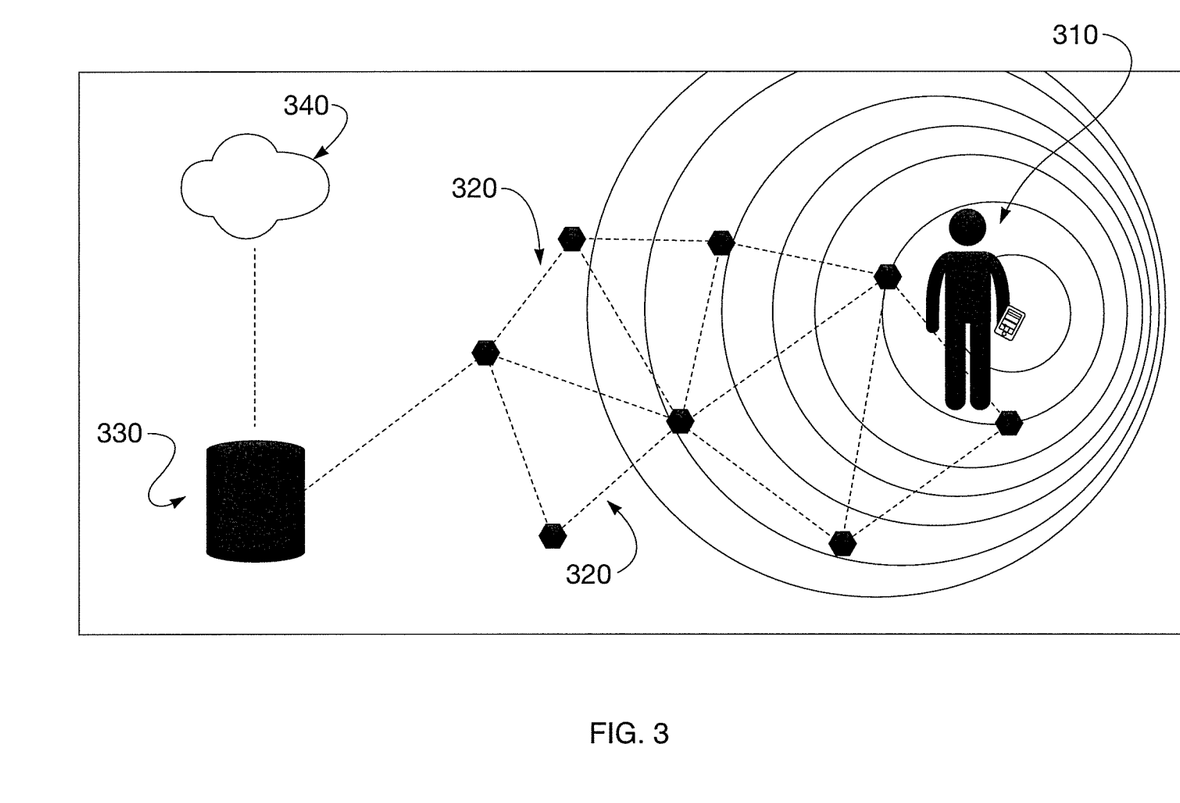
FIG. 3 is an illustration showing the effect of user/object movement through the Bluefield apparatus, under an embodiment

FIG. 3 shows a user/object moving through the Bluefield apparatus. The user/object (or mobile device) 310 moves through relay nodes 320 and communicates with such nodes in a manner already disclosed above. FIG. 3 shows parent module 330 and cloud master 340, under an embodiment.

Figure 4:
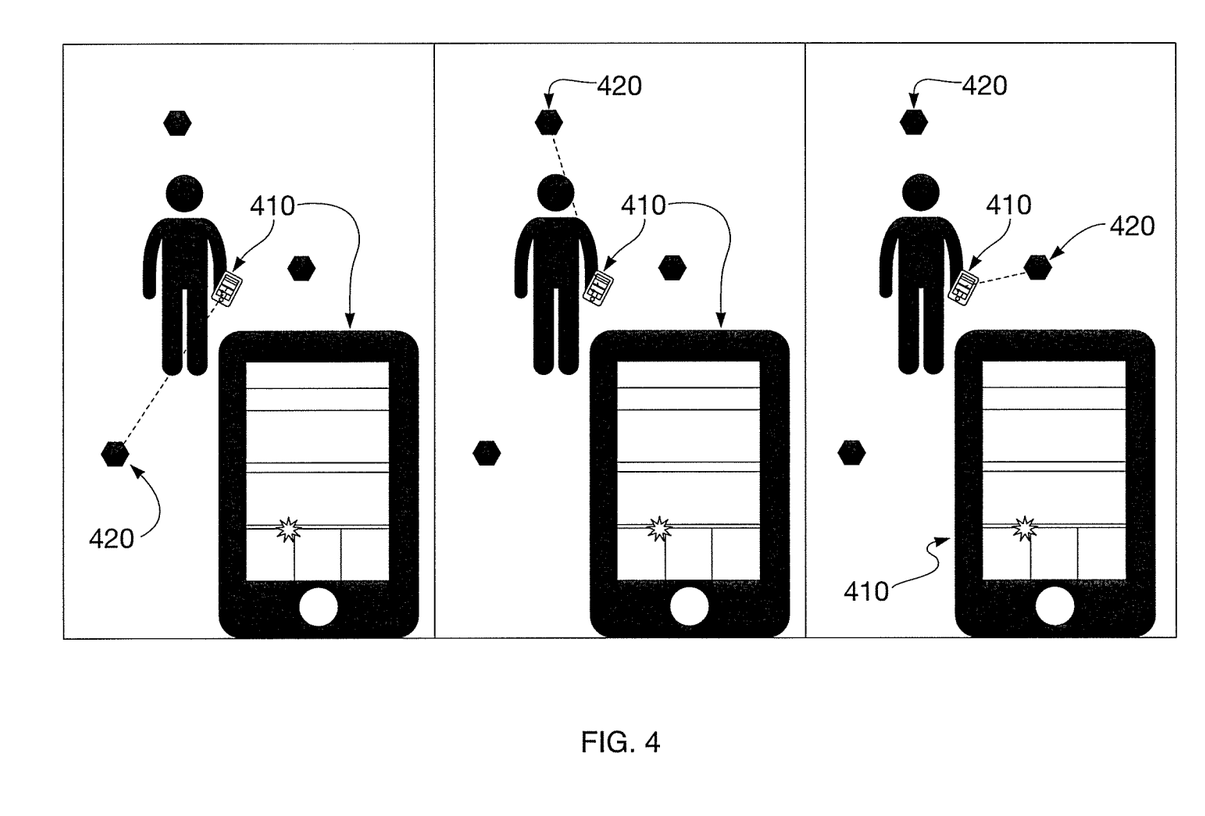
FIG. 4 is an illustration showing the operation of the Bluefield Browser, under an embodiment.

FIG. 4 shows operation of the Bluefield Browser displayed on a mobile device 410 of a user. The Browser may provide a MiLoCHI or SIIM-GUI gaphical user interface and corresponding functionality as already described above. FIG. 4 shows a mobile device 410 of a user receiving information from relay nodes 420.

Figure 5:
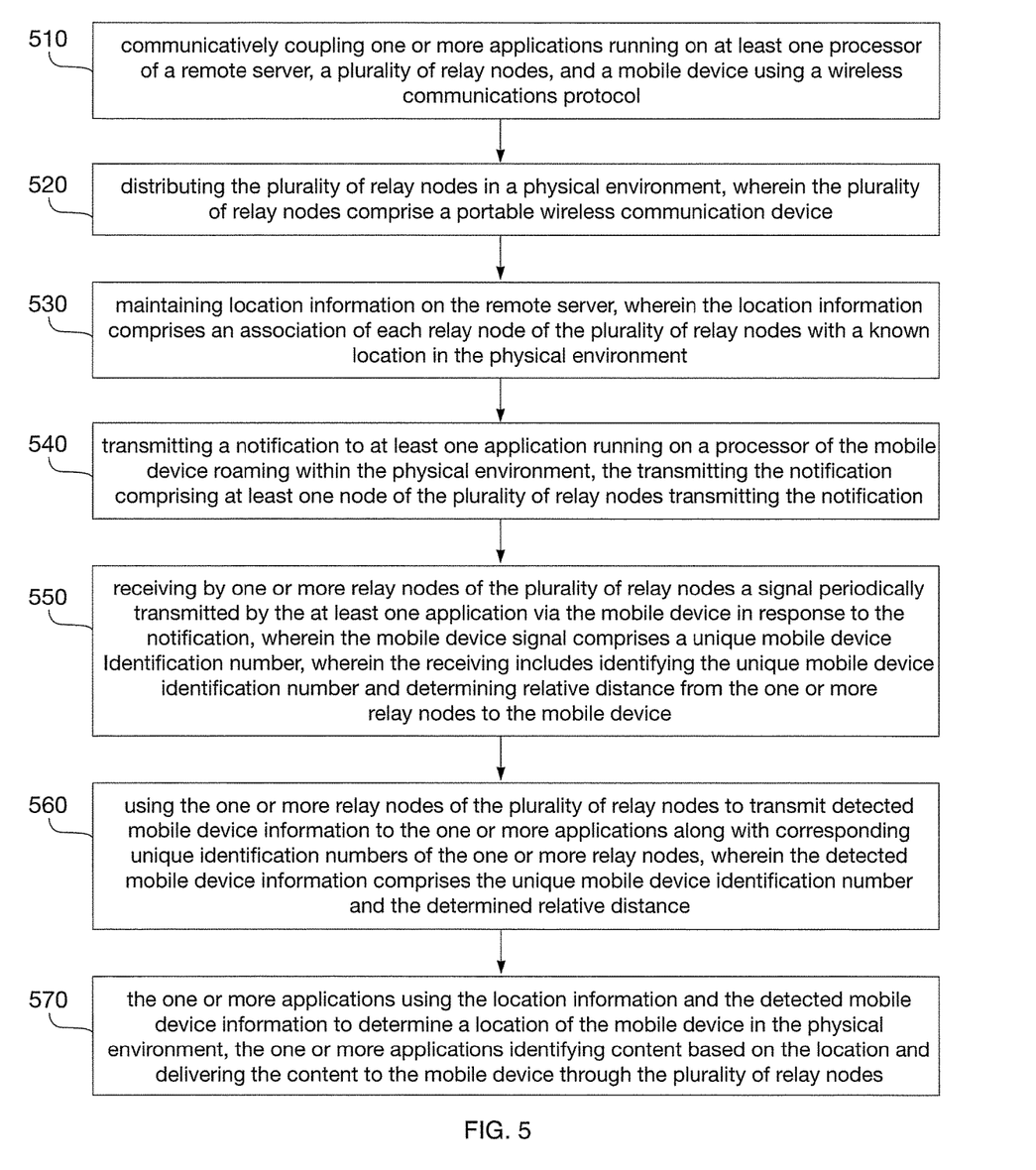
FIG. 5 shows a method for tracking and distributing content to a device through a wireless communications network, under an embodiment.

FIG. 5 shows a method for tracking and distributing content to a device through a wireless communications network, under an embodiment. Step 510 includes communicatively coupling one or more applications running on at least one processor of a remote server, a plurality of relay nodes, and a mobile device using a wireless communications protocol. Step 520 includes distributing the plurality of relay nodes in a physical environment, wherein the plurality of relay nodes comprise a portable wireless communication device. Step 530 includes maintaining location information on the remote server, wherein the location information comprises an association of each relay node of the plurality of relay nodes with a known location in the physical environment. Step 540 includes transmitting a notification to at least one application running on a processor of the mobile device roaming within the physical environment, the transmitting the notification comprising at least one node of the plurality of relay nodes transmitting the notification. Step 550 includes receiving by one or more relay nodes of the plurality of relay nodes a signal periodically transmitted by the at least one application via the mobile device in response to the notification, wherein the mobile device signal comprises a unique mobile device identification number, wherein the receiving includes identifying the unique mobile device identification number and determining relative distance from the one or more relay nodes to the mobile device. Step 560 includes using the one or more relay nodes of the plurality of relay nodes to transmit detected mobile device information to the one or more applications along with corresponding unique identification numbers of the one or more relay nodes, wherein the detected mobile device information comprises the unique mobile device identification number and the determined relative distance. Step 570 includes the one or more applications using the location information and the detected mobile device information to determine a location of the mobile device in the physical environment, the one or more applications identifying content based on the location and delivering the content to the mobile device through the plurality of relay nodes.

This disclosure provides an apparatus, devices and methods that provide technical advantages including the following:

The apparatus and devices provide a Bluetooth® network with the ability to monitor and track the location of objects, users and individual components of the network apparatus, under an embodiment;

The apparatus and devices allow for the collection of location-based and communication-based information and metadata, under an embodiment;

The apparatus and devices can be deployed using multiple methods (including deliberate deployment method OR automatic deployment method) depending on the required application, under an embodiment;

The apparatus and devices can be controlled and monitored externally via a server based platform which may be easily accessed and operated via the internet, under an embodiment;

The apparatus and devices self-monitor and can be deployed to provide redundancy in order to maintain homeostasis for robustness and stability, under an embodiment;

The apparatus and devices can self-expand to other compatible devices thus extending its reach, programming capacity and data collection volume, under an embodiment;

The apparatus and devices deliver content to the user in a non-fatiguing, passive format, under an embodiment.

The systems and methods described herein include a Bluetooth®-enabled wireless communication network apparatus for content distribution and mobile device access. The apparatus comprises a programmable internet-based server system cloud-master. The server system includes an arrangement capable of wireless communication. The server system is able to communicate with one or more parent modules' simultaneously via wireless internet protocols. The server system is able to control the embedded code and thus the function of the parent modules. The server system collects all metadata transferred and communicated via the parent module. The server system is equipped with analytical tools to characterize all collected data and commands into interpretable data.

The network apparatus comprised under an embodiment a peripheral and portable parent-module device comprising an arrangement capable of wireless communication, wherein the device possesses a unique identification, wherein the device is able to communicate with the cloud-master and/or with one or more individual relay nodes simultaneously via wirelessly-enabled internet protocols, wherein the device is able to control the embedded code and thus the function of the individual relay nodes within Bluetooth® range; wherein the device is able to receive and monitor the transmission received from the individual relay nodes within Bluetooth® range, wherein the device transmits received information and metadata from individual relay nodes to the 'cloud master'.

The network apparatus comprises under one embodiment one or more individual relay node devices, comprising an arrangement capable of wireless communication which function similarly to Bluetooth® beacons, wherein the device possesses a unique identification, wherein the device may communicate and transmit data and instructions via signals tagged with their unique identification and their corresponding RSSI, wherein the device receives signals, instructions, data, and determines RSSI from other individual relay nodes, parent modules, Bluetooth®-enabled mobile devices, or Bluetooth®-enabled mobile devices comprising Bluefield-enabled embedded code; and wherein the device communicates received data, RSSI, and metadata to the parent module via Bluetooth®, wherein the device controls the embedded code and thus the function of other individual relay nodes and/or other compatible Bluetooth®-enabled devices not yet associated with the apparatus.

The network apparatus comprises an end user or object including an object that absorbs Bluetooth® electromagnetic waves and an end user utilizing a Bluetooth® compatible mobile device, wherein upon recognition by an individual relay node, becomes an individual relay node, wherein, unlike individual relay nodes, end user devices execute instructions from individual relay nodes which are sent from the apparatus, wherein end user devices collect and store information for later use, analysis or display.

The network apparatus may under an embodiment be deployed deliberately in a physical infrastructure according to a map of the infrastructure.

The network apparatus may under an embodiment be deployed in an auto-dispersive fashion without regard to specific design of the infrastructure or space.

The network apparatus is under an embodiment implemented with redundancy, where apparatus components duplicate the actions or critical functions of the apparatus.

The network apparatus is under an embodiment implemented with self-stabilization capability via self-modification of individual components in order to maintain the required function of the individual components and thus the apparatus.

The network apparatus may under an embodiment metastasize to other Bluetooth®-enabled beacons via reprogramming of embedded code "over-the air".

The network apparatus may under an embodiment detect absorbing objects and living objects within range.

The network apparatus delivers under an embodiment URL hyperlinked-content using a micro-location based cascading hyperlinked-content interface or a superimposed, infrastructure map-based graphical user interface.

The network apparatus under an embodiment interfaces with third party applications.

The mobile device may under an embodiment be a smartphone, tablet or other computing platform such as a laptop or hybrid platform.

The cloud master may under an embodiment operate as a web application or website stored, accessed and utilized via server.

The cloud master may under an embodiment be the hierarchical controller of the apparatus.

The parent module under an embodiment may be the mid-level manager of the apparatus.

The individual relay nodes under an embodiment may be deemed the cog of the apparatus.

The deployment of the network apparatus may under an embodiment be carefully designed to optimize coverage by taking into account signal absorbing materials, module/node signal radius, and the purpose for the deployment.

The signal absorbing materials may be under an embodiment walls, large objects and water, The module/node signal radius may under an embodiment be recognized via RSSI.

The purpose for deployment of the network apparatus may under an embodiment be specifically designed to target one area or others.

The potential locations of the parent modules and individual relay nodes may under an embodiment be superimposed on an infrastructural map.

Upon initialization of the components of the apparatus, individual relay nodes and parent nodes may under an embodiment discover the distance between nearby individual relay nodes, parent modules and users via Bluetooth®.

The distance between apparatus components are determined via RSSI under an embodiment.

Through the use of a programmable internet client, a user may under an embodiment view a map of the infrastructure superimposed with the real-time location of the components of the apparatus.

The programmable internet client may under an embodiment be used by a user via a graphical user interface.

The user may under an embodiment utilize the graphical user interface and click on a particular component of the apparatus and re-program its function or check component status.

The programmable internet client interfaces with the cloud master which may under an embodiment communicate instructions to and receive responses from the desired individual component of the apparatus where an administrator may also select areas of the map and upload content to be delivered to specific individual relay nodes within the designated area.

The auto-dispersive deployment technique under an embodiment relies on the self-detection of the individual components of the apparatus.

The components of the apparatus detects under an embodiment the presence and relative location of each component inherently—and thus mapped automatically.

The automatically mapped component locations are then superimposed in real-time on a schematic, map or image with the parent module(s) as a point of reference under an embodiment.

The auto-dispersive deployment may under an embodiment be controlled, modified and monitored using a programmable internet client.

The apparatus alerts those monitoring the apparatus when self-stabilization, redundancy, or metastasis is employed, under an embodiment.

The cloud master controls monitoring and messaging, under an embodiment.

Empirical RSSI deflections may be used under an embodiment to determine if a living object has moved through the apparatus.

Empirical RSSI deflections may under an embodiment be determined through empirical testing of the transient effect on RSSI between apparatus components due to the absorptive nature of living objects.

The transient of effect on RSSI may under an embodiment be determined for objects each of various size, densities, and composition.

Content may under an embodiment arrive in the form of a hyperlinked image, moving image or graphic, such that, upon a click, the user may be directed to content at a particular URL.

The URL, may under an embodiment direct users to resources, media and information.

The URL may under an embodiment allow infrastructural access.

The URL may under an embodiment direct users to point of sale applications.

The URL may under an embodiment display advertisements.

Newly arriving hyperlinked-content may under an embodiment be displayed on top of, or in front of, previous content which was delivered previously due to the prior micro-location of the user.

Hyperlinked-content may under an embodiment be superimposed on a real-time schematic of the locations of the apparatus components, or other specific locations, also superimposed on a map of the infrastructure in which the apparatus has been deployed.

As the user moves through the apparatus, the location of the user may under an embodiment be depicted in real-time on the interface.

As the user approaches a specific contextual location, displayed content may under an embodiment grow to a larger size on the graphical user interface allowing the user to view and click.

The content displaying graphical user interface aesthetics, imagery and skin may under an embodiment change depending on the location of the device operating the interface within the apparatus or within specific areas as determined by other wireless locationing modalities.

A third party application may under an embodiment interface with the apparatus through the use of a software development kit (SDK), application program interface (API), a direct data draw or a combination thereof.

The apparatus may under an embodiment detect the location of standard, Bluetooth® beacons for triangulation with respect to other individual relay nodes, later display, use or analysis.

The apparatus may under an embodiment average the GPS/WiFi/Bluefield estimate locations of the unknown beacons as provided to the parent module or cloud master by the individual relay node in high proximity to the unknown beacon.

Parent modules detect and transmit under an embodiment the unknown Bluetooth® beacon UUIDs to the individual relay nodes in order to begin the discovery process.

The individual relay nodes may under an embodiment be Bluetooth®-enabled mobile devices comprising Bluefield apparatus embedded code.

A system described herein comprises under an embodiment a master component, a plurality of relay nodes, and a mobile device comprising at least one application running on a processor of the mobile device, wherein the master component comprises one or more applications running on at least one processor of a remote server, wherein each relay node comprises a portable wireless communication device, wherein the master component, the plurality of relay nodes and the mobile device are communicatively coupled using a wireless communications protocol.

The system distributes under an embodiment the plurality of relay nodes in a physical environment.

The master component provides under an embodiment location information, wherein the location information comprises an association of each relay node of the plurality of relay nodes with a known location in the physical environment.

The mobile device enters the physical environment under an embodiment, wherein at least one node of the plurality of relay nodes transmits a notification to the at least one application.

In response to receiving the notification the at least one application periodically transmitting a signal via the mobile device under an embodiment, wherein the mobile device signal comprises a unique mobile device identification number, wherein one or more relay nodes of the plurality of relay nodes detects the mobile device signal, wherein the detecting includes identifying the unique mobile device identification number and determining relative distance from the one or more relay nodes to the mobile device;

The one or more relay nodes of the plurality of relay nodes transmits detected mobile device information to the master component along with corresponding unique identification numbers of the one or more relay nodes under an embodiment, wherein the detected mobile device information comprises the unique mobile device identification number and the determined relative distance.

The master component uses the location information and the detected mobile device information under an embodiment to determine a location of the mobile device in the physical environment.

The wireless communications protocol comprises under an embodiment at least one Bluetooth communications protocol.

The mobile device under an embodiment is Bluetooth enabled, wherein the plurality of relay nodes comprise Bluetooth enabled beacons.

The master component and the plurality of relay nodes under an embodiment are communicatively coupled through at least one parent module, wherein the at least one parent module comprises a Bluetooth enabled beacon.

The mobile device signal under an embodiment comprises a request for a location of the mobile device from the master component.

The one or more relay nodes under an embodiment comprises at least three relay nodes.

The determining relative distance under an embodiment comprises determining relative distance based on signal strength of the mobile device signal.

The master component uses the location information under an embodiment to identify known locations of the at least three relay nodes.

The determining a location of the mobile device includes under an embodiment using the relative distance to at least three relay nodes and the known locations of the at least three relay nodes to estimate the location of the mobile device.

The master component identities under an embodiment contextualized content for delivery to the mobile device based on the location of the mobile device.

The contextualized content comprises under an embodiment a U directing a browser running on the mobile device to the contextualized content.

The browser organizes under an embodiment the contextualized content according to a priority based on the location of the mobile device.

The master component delivers under an embodiment the contextualized content to the mobile device through at least one of the parent module and the plurality of relay nodes.

The identifying the contextualized content includes under an embodiment identifying target content based upon a target location in the physical environment, wherein the contextualized content includes the target content.

The delivering the contextualized content includes under an embodiment delivering the target content to the mobile device when the mobile device is one or more of in a proximity to the target location and at the target location.

Each node of the plurality of relay nodes periodically transmits a signal under an embodiment, wherein the signal comprises a corresponding unique identification number.

Each relay node of the plurality of relay nodes detects signals of other relay nodes within the range under an embodiment, wherein each relay node identifies a corresponding identification number of detected signals and uses signal strength of each detected signal to determine relative distance from each relay node to corresponding transmitting relay nodes.

Each relay node collects under an embodiment information of the detected signals including identification number and corresponding relative distance and transmits the collected relay node information to the master component.

The mobile device comprises under an embodiment a smartphone, tablet, computing-enabled wearable, a laptop and a hybrid platform.

A method described herein comprises under an embodiment communicatively coupling one or more applications running on at least one processor of a remote server, a plurality of relay nodes, and a mobile device using a wireless communications protocol.

The method includes under an embodiment distributing the plurality of relay nodes in a physical environment, wherein the plurality of relay nodes comprise a portable wireless communication device.

The method includes under an embodiment maintaining location information on the remote server, wherein the location information comprises an association of each relay node of the plurality of relay nodes with a known location in the physical environment.

The method includes under an embodiment transmitting a notification to at least one application running on a processor of the mobile device roaming within the physical environment, the transmitting the notification comprising at least one node of the plurality of relay nodes transmitting the notification.

The method includes under an embodiment receiving by one or more relay nodes of the plurality of relay nodes a signal periodically transmitted by the at least one application via the mobile device in response to the notification, wherein the mobile device signal comprises a unique mobile device identification number, wherein the receiving includes identifying the unique mobile device identification number and determining relative distance from the one or more relay nodes to the mobile device.

The method includes under an embodiment using the one or more relay nodes of the plurality of relay nodes to transmit detected mobile device information to the one or more applications along with corresponding unique identification numbers of the one or more relay nodes, wherein the detected mobile device information comprises the unique mobile device identification number and the determined relative distance.

The method includes under an embodiment the one or more applications using the location information and the detected mobile device information to determine a location of the mobile device in the physical environment, the one or more applications identifying content based on the location and delivering the content to the mobile device through the plurality of relay nodes.

It is understood that the systems and methods described herein are merely illustrative. Other arrangements may be employed in accordance the embodiments set forth below. Further, other variations of the systems and methods may comply with the spirit of the embodiments set forth herein. Computer networks suitable for use with the embodiments described herein include local area networks (LAN), wide area networks (WAN). Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for object tracking and content distribution through a wireless communications network can be a component of a single system, multiple systems, and/or geographically separate systems. The systems and methods for object tracking and content distribution through a wireless communications network can also be a subcomponent or subsystem of a single system, multiple systems, and/or geographically separate systems. The components can be coupled to one or more other components (not shown) of a host system or a system coupled to the host system.

One or more components of the systems and methods for object tracking and content distribution through a wireless communications network and/or a corresponding interface, system or application to which the systems and methods for object tracking and content distribution through a wireless communications network is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for object tracking and content distribution through a wireless communications network can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for object tracking and content distribution through a wireless communications network and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for object tracking and content distribution through a wireless communications network and corresponding systems and methods include: microcontrollers with memory (such as electronically erasable programmable read only memory (EEPROM)), embedded microprocessors, firmware, software, etc. Furthermore, aspects of the systems and methods for object tracking and content distribution through a wireless communications network and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively.

Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for object tracking and content distribution through a wireless communications network and corresponding systems and methods is not intended to be exhaustive or to limit the systems and methods to the precise forms disclosed. While specific embodiments of, and examples for, the systems and methods for object tracking and content distribution through a wireless communications network and corresponding systems and methods are described herein for illustrative purposes, various equivalent modifications are possible within the scope of the systems and methods, as those skilled in the relevant art will recognize. The teachings of the systems and methods for object tracking and content distribution through a wireless communications network and corresponding systems and methods provided herein can be applied to other systems and methods, not only for the systems and methods described above.

The elements and acts of the various embodiments described above can be combined to provide further embodiments. These and other changes can be made to the systems and methods for object tracking and content distribution through a wireless communications network and corresponding systems and methods in light of the above detailed description.

We claim:

1. A system comprising,
a master component, a plurality of relay nodes, and a mobile device comprising at least one application running on a processor of the mobile device, wherein the master component comprises one or more applications running on at least one processor of a remote server, wherein each relay node comprises a portable wireless communication device, wherein the master component, the plurality of relay nodes and the mobile device are configured to communicatively coupled using a wireless communications protocol, wherein the plurality of relay nodes are positionable in a physical environment;

the master component configured to maintain location information, wherein the location information comprises an association of each relay node of the plurality of relay nodes with its known location in the physical environment;

at least one node of the plurality of relay nodes configured to transmits a notification to the at least one application running on the processor of the mobile device;

the at least one application configured to periodically transmit a mobile device signal via the mobile device in response to receiving the notification, wherein the mobile device signal comprises a unique mobile device identification number, wherein one or more relay nodes of the plurality of relay nodes is configured to detects the mobile device signal, wherein the detecting includes identifying the unique mobile device identification number and determining relative distance from the one or more relay nodes to the mobile device;

the one or more relay nodes of the plurality of relay nodes configured to transmit detected mobile device information to the master component along with corresponding unique identification numbers of the one or more relay nodes, wherein the detected mobile device information comprises the unique mobile device identification number and the determined relative distance;

the master component configured to use the location information and the detected mobile device information to determine a location of the mobile device in the physical environment; and the master component configured to send an additional relay node identification number of an additional relay node to the mobile device, the mobile device configured to detect the additional relay node identification number periodically transmitted by the additional relay node the mobile device configured to estimate a location of the additional relay node when the mobile device detects the additional relay node identification number and is within a first distance of the additional relay node.

* * * * *